US007912621B2

(12) United States Patent
Bauerle et al.

(10) Patent No.: US 7,912,621 B2
(45) Date of Patent: Mar. 22, 2011

(54) DUAL THROTTLE POSITION SENSOR DIAGNOSTIC SYSTEM WITH REDUCED STALLING

(75) Inventors: Paul A. Bauerle, Fenton, MI (US); Marco J. Gatti, Southgate, MI (US); Joseph M. Stempnik, Warren, MI (US); Jonathan Packard, Madison Heights, MI (US); Anne M. Lemoigne, Ann Arbor, MI (US); Pahngroc Oh, Ann Arbor, MI (US); Daniel G. Bolstrum, West Bloomfield, MI (US)

(73) Assignee: GM Global Technology Operations LLC

( * ) Notice: Subject to any disclaimer, the term of this patent is extended or adjusted under 35 U.S.C. 154(b) by 571 days.

(21) Appl. No.: 12/039,210

(22) Filed: Feb. 28, 2008

(65) Prior Publication Data

US 2009/0240418 A1 Sep. 24, 2009

Related U.S. Application Data

(60) Provisional application No. 60/977,533, filed on Oct. 4, 2007.

(51) Int. Cl.
*F02D 41/00* (2006.01)
*G01M 15/04* (2006.01)

(52) U.S. Cl. ........................................ 701/103; 123/361

(58) Field of Classification Search .................. 701/103, 701/101, 102, 115, 107, 29; 123/361, 399
See application file for complete search history.

(56) References Cited

U.S. PATENT DOCUMENTS

| | | | | |
|---|---|---|---|---|
| 4,999,781 A * | 3/1991 | Holl et al. | ..................... | 701/108 |
| 6,751,544 B2 * | 6/2004 | Hashimoto et al. | ........... | 701/107 |
| 6,799,110 B2 * | 9/2004 | Hashimoto et al. | ............. | 701/62 |
| 6,899,080 B2 * | 5/2005 | Pursifull et al. | .............. | 123/399 |
| 2010/0229828 A1 * | 9/2010 | Bauerle et al. | ................ | 123/361 |

* cited by examiner

*Primary Examiner* — Hieu T Vo

(57) ABSTRACT

A system includes an out of correlation (OOC) detection module that detects an OOC error between a first throttle position sensor (TPS) and a second TPS. An out of range (OOR) detection module that detects first and second OOR errors for the first and second TPS, respectively. An OOC counter sets an OOC error when an OOC count is greater than or equal to a first OOC value. An OOR counter sets first and second OOR errors when first and second OOR counts, respectively, are greater than or equal to a second OOR value that is less than the first OOC value. A control module increments the counters when the respective errors occur and sets at least one of the first and second OOR counts equal to the OOC count when at least one of the first and second OOR errors occur after the OOC error.

20 Claims, 4 Drawing Sheets

DUAL THROTTLE POSITION SENSOR DIAGNOSTIC SYSTEM WITH REDUCED STALLING

CROSS-REFERENCE TO RELATED APPLICATIONS

This application claims the benefit of U.S. Provisional Application No. 60/977,533, filed on Oct. 4, 2007. The disclosure of the above application is incorporated herein by reference in its entirety.

FIELD

The present disclosure relates to engine control systems, and more particularly to diagnostic systems and methods for engine control systems with two or more throttle position sensors.

BACKGROUND

The statements in this section merely provide background information related to the present disclosure and may not constitute prior art.

Referring now to FIG. 1, a functional block diagram of an engine system 100 is shown. Air is drawn through a throttle valve 102 into an intake manifold 104. An air fuel mixture is created by injecting fuel from a fuel injector 106 into the intake manifold 104. The air fuel mixture is drawn through an intake valve 108 into a representative cylinder 110. An ignition coil 112 activates a spark plug 114 to ignite the air/fuel mixture within the cylinder 110. After ignition, an exhaust valve 116 allows the cylinder 110 to vent the products of combustion to an exhaust system 118.

A control module 120 receives signals from first and second throttle position sensors (TPS's) 122 and 124. The control module 120 outputs a control signal to an electronic throttle control (ETC) motor 126, which actuates the throttle valve 102. The control module 120 controls the fuel injector 106 and the ignition coil 112. The control module 120 monitors inputs, such as a position of a gas pedal (not shown), determines a desired throttle position, and instructs the ETC motor 126 to actuate the throttle valve 102 to the desired throttle position.

In general, the engine control module activates the ETC motor to position the throttle according to a desired throttle area determined in response to accelerator pedal position and various other control functions, such as idle speed control, engine governor control, cruise control, and traction control. Some engine control systems set indicated throttle to a higher one of the first and second TPS's during an out of correlation (OOC) error and/or fault. The OOC error occurs when a difference between the two TPS sensors is greater than a predetermined threshold.

An out of range (OOR) error may also occur. The TPS sensors may be set to provide a voltage output between first and second voltages. For example, a first TPS may provide a voltage between 0.5 V and 4.5 V corresponding to closed throttle and wide open throttle (WOT). The second TPS may provide a voltage between 4.5 V and 0.5 V corresponding to closed throttle and wide open throttle (WOT). Outputs of the first and second TPS may be input to a lookup table (LUT), which converts the voltages from both the first and second TPS to a percentage of throttle. The OOR error may occur for one of the sensors when the voltage is greater than 4.5 V or less than 0.5 V.

Typically, the OOC error occurs before the OOR error. When the higher of the two TPS is selected during the OOC error, the closed-loop control system may try to close the throttle and the engine may stall.

Also, when a TPS OOC fault is set due to the TPS sensors shorted together, engine shutdown may occur because indicated throttle was set higher than the throttle return fault diagnostic expected. When the throttle OOC fault occurs because one of the sensors is shifted high (which is most likely case), the system will use the high throttle position for the remainder of the ignition cycle. The engine stalls in most cases since the control system will drive the throttle into the stop.

SUMMARY

A system comprises an out of correlation (OOC) detection module that detects an OOC error between a first throttle position sensor (TPS) and a second TPS. An out of range (OOR) detection module detects first and second OOR errors for the first and second TPS, respectively. An OOC counter sets an OOC error when an OOC count is greater than or equal to a first OOC value. An OOR counter sets first and second OOR errors when first and second OOR counts, respectively, are greater than or equal to a second OOR value that is less than the first OOC value. A control module increments the OOC count when the OOC error occurs, the first OOR count when the first OOR error occurs, and the second OOR count when the second OOR error occurs. The control module sets at least one of the first and second OOR counts equal to the OOC count when the at least one of the first and second OOR errors occur after the OOC error.

A method comprises detecting an OOC error between a first throttle position sensor (TPS) and a second TPS; detecting first and second OOR errors for the first and second TPS, respectively; setting an OOC error when an OOC count is greater than or equal to a first OOC value; setting first and second OOR errors when first and second OOR counts, respectively, are greater than or equal to a second OOR value that is less than the first OOC value; incrementing the OOC count, the first OOR count, and the second OOR count when the OOC error, the first OOR error and the second OOR error, respectively, occur; and setting at least one of the first and second OOR counts equal to the OOC count when the at least one of the first and second OOR errors occur after the OOC error.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
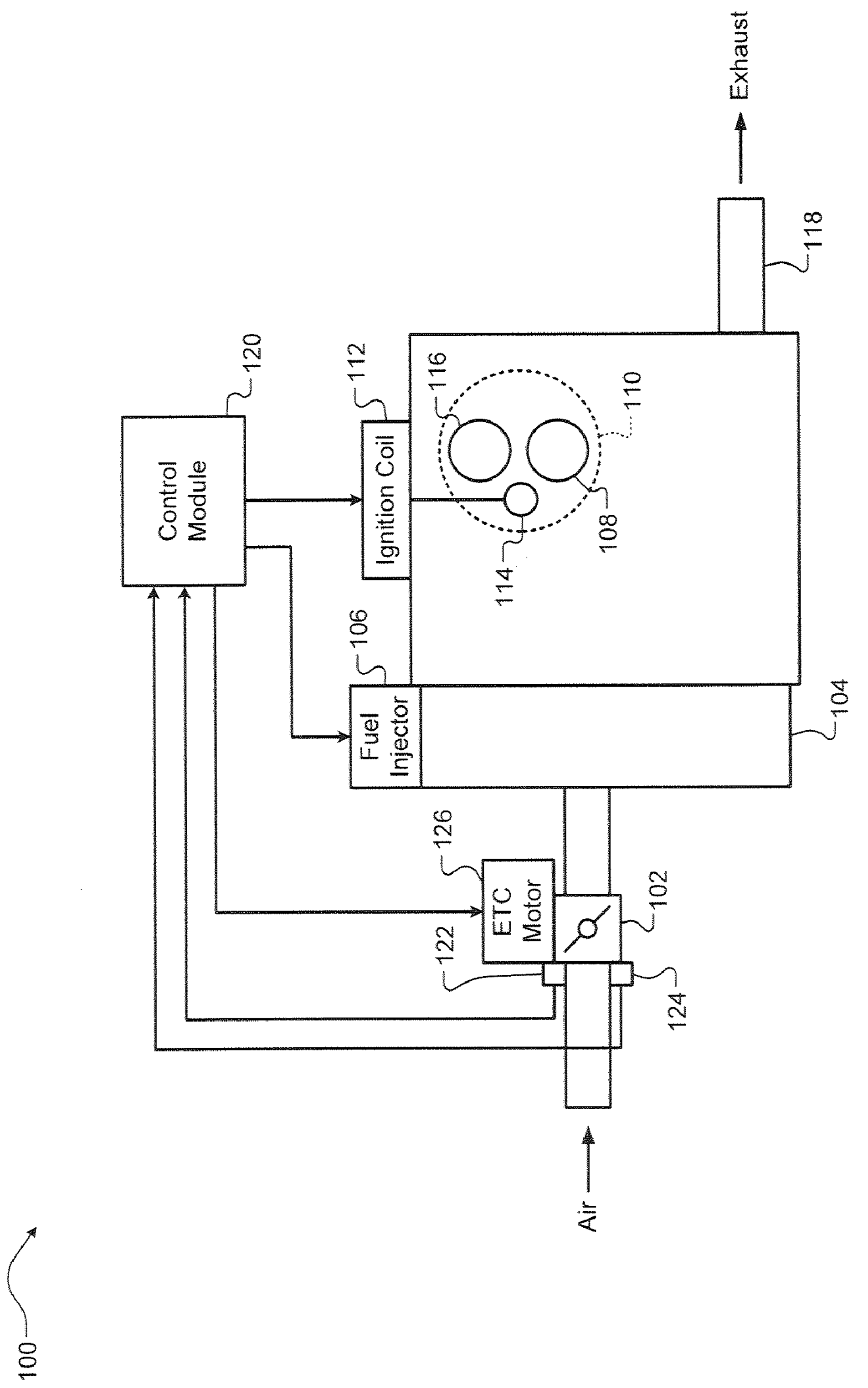
FIG. 1 Prior Art
FIG. 1 is a functional block diagram of an engine control system according to the prior art.

The following description is merely exemplary in nature and is not intended to limit the present disclosure, application, or uses. It should be understood that throughout the drawings, corresponding reference numerals indicate like or corresponding parts and features.

Figure 2A:
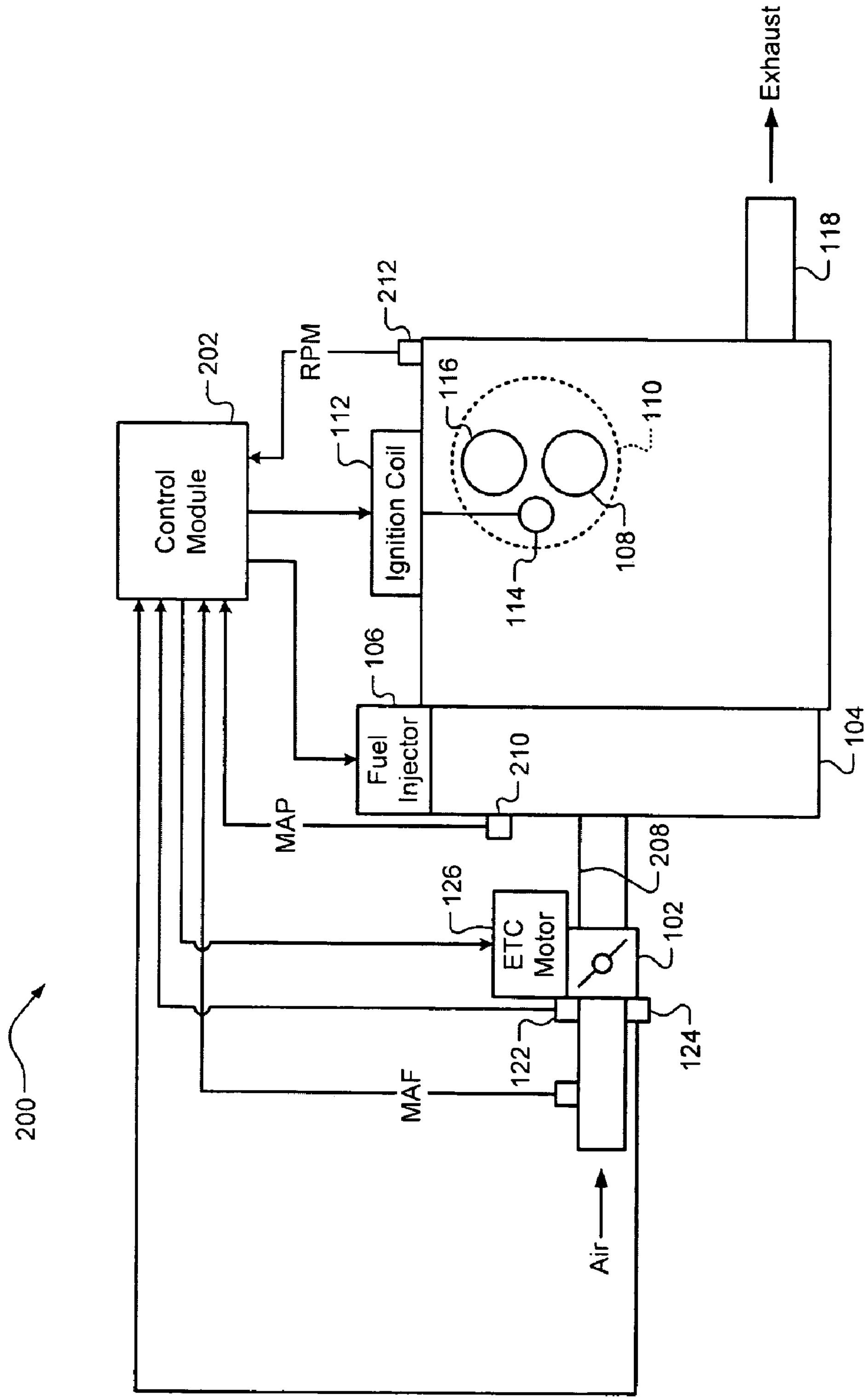
FIG. 2A is a functional block diagram of an engine control system according to the present disclosure.

Referring now to FIG. 2A, a functional block diagram of an exemplary engine system 200 according to the present disclosure is shown. For purposes of clarity, reference numerals from FIG. 1 are used to identify similar components.

The control module 202 receives throttle position signals from the first and second throttle position sensors (TPS's) 122 and 124. The control module 202 receives a mass air flow (MAF) signal from a MAF sensor 208 and a manifold absolute pressure (MAP) signal from a MAP sensor 210. The control module 202 receives an engine speed signal in revolutions per minute (RPM) from an RPM sensor 212, which is in communication with a crankshaft (not shown). The control module 202 may also receive other signals (not shown).

The control module 202 communicates control signals to the fuel injector 106, the ignition coil 112, and the electronic throttle control (ETC) motor 126. Based upon inputs such as an accelerator pedal position, the control module 202 instructs the ETC motor 126 to open and close the throttle valve 102. The control module 202 determines the position of the throttle valve 102 based upon signals from the TPS's 122 and 124.

If the TPS's 122 or 124 have OOC and/or OOR errors and/or faults, the control module 202 may take corrective action with respect to indicated throttle position. The throttle valve 102 may include return springs that, in the absence of power to the ETC motor 126, will return the throttle valve 102 to a learned default position. For example only, the learned default position may be a throttle position in the 20-30% throttle range. This will allow the vehicle to operate in a “limp home” mode.

The ETC motor may set the throttle based on a difference between indicated throttle (indicated by TPS1 or TPS2 when no errors are present or set by the control module to default or desired throttle in some circumstances) and a desired throttle generated by the control module.

Figure 2B:
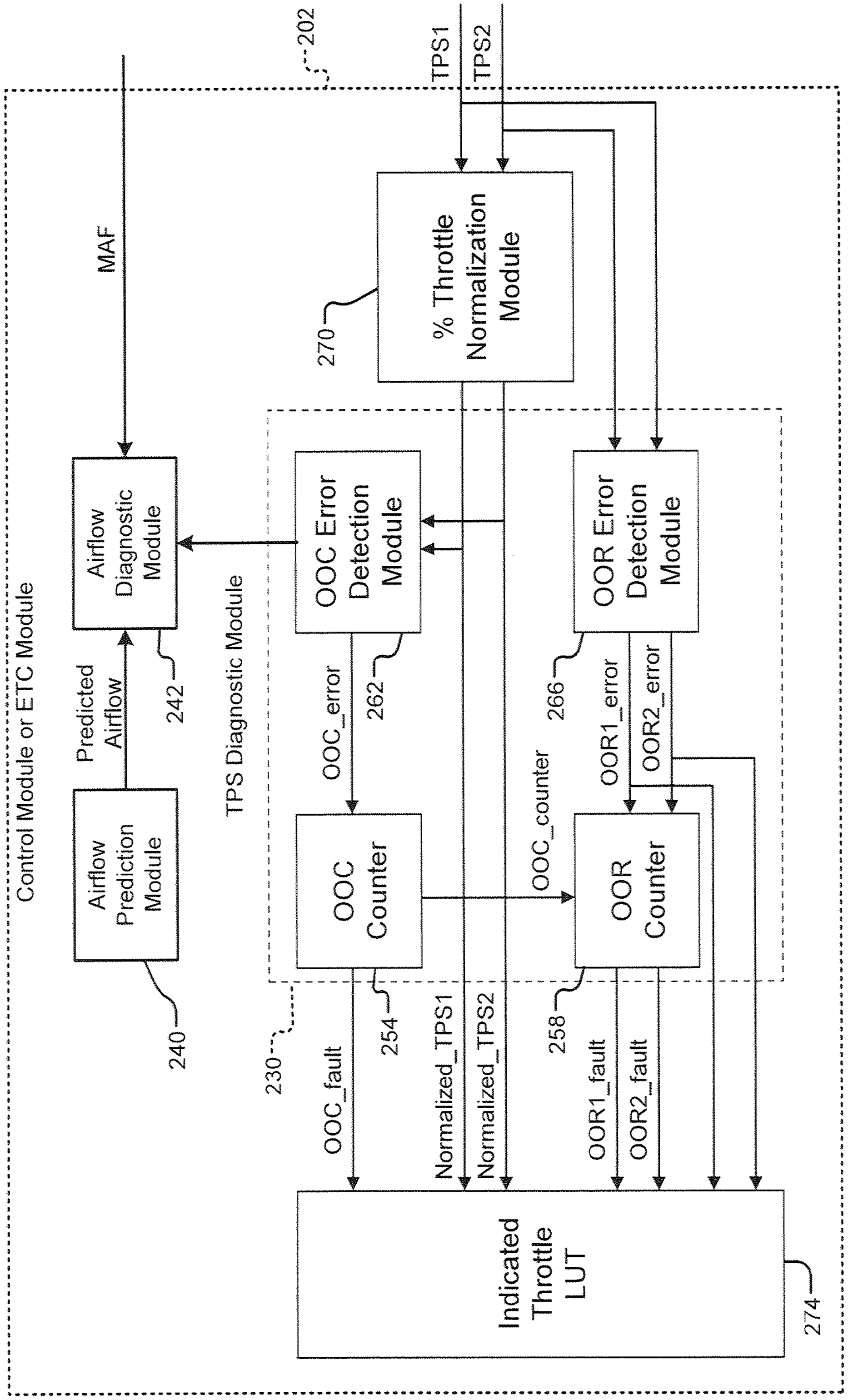
FIG. 2B is a functional block diagram of the control module or ETC module according to the present disclosure.

Referring now to FIG. 2B, the control module 202 may include a TPS diagnostic module 230, an airflow prediction module 240 and an airflow diagnostic module 242. The airflow prediction module 240 predicts airflow based on engine operating conditions. The airflow diagnostic module 242 compares the airflow prediction with measured airflow and selectively generates a fault when the difference is greater than calibrated thresholds. During some circumstances, the TPS diagnostic module will disable the airflow diagnostic module 242 to prevent detection of airflow errors as will be described further below.

The TPS diagnostic module 230 further includes an OOC counter 254, an OOR counter 258, an OOC error detection module 262, an OOR error detection module 266, a percentage (%) throttle normalization module 270 and an indicated throttle LUT 274. The OOC error detection module 262 compares the first and second % throttle signals from the percentage throttle normalization module 270. If the two values differ by more than a predetermined amount, an OOC error occurs. If the error persists for a first predetermined number of cycles (first OOC value) as determined by the OOC counter 254, an OOC fault occurs. One error and/or fault is generated for both TPS1 and TPS2 when the OOC error and/or fault occurs. As can be appreciated, the raw TPS1 and TPS2 data can also be compared to determine whether an OOC error occurred.

The OOR error detection module 266 compares both the TPS1 and TPS2 signals to upper and lower limits. For example, the TPS1 and TPS2 ranges may be between 0.5V and 4.5V. If either sensor is greater than the upper limit or less than the lower limit, an OOR error occurs for the respective TPS. If the error persists for a second number of cycles (or second OOR value) as determined by the OOR counter 258, an OOR fault occurs for the TPS. The indicated throttle LUT 274 sets indicated throttle based on the OOC error and/or fault and the OOR errors and/or faults as will be described below.

Figure 3:
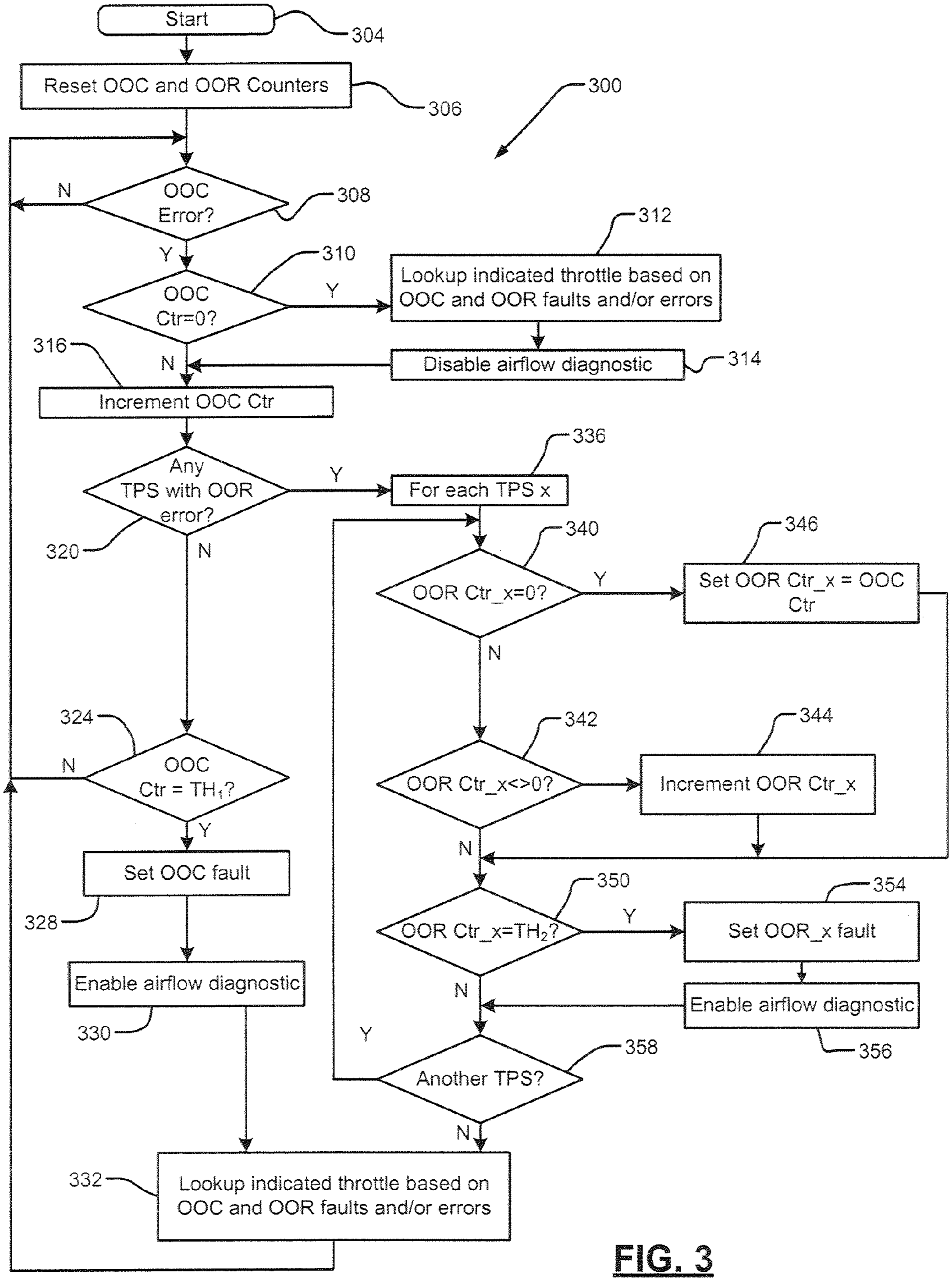
FIG. 3 is a flowchart illustrating steps of a method for controlling indicated throttle during OOC and/or OOR errors and/or faults.

Referring now to FIG. 3, steps for operating the TPS diagnostic system are shown at 300. Control begins with step 304. In step 306, the OOC and OOR counters are set to zero. In step 308, control determines whether an OOC error has occurred. If step 308 is true, control determines whether an OOC counter is equal to zero in step 310. If step 310 is true, control accesses the LUT and determines indicated throttle in step 312 based on the OOC and OOR errors and/or faults. In this case, there is an OOC error and no OOR error and control sets indicated throttle equal to desired throttle to prevent stalling. In step 314, control disables the airflow diagnostic to prevent airflow errors from being triggered as a result of the OOC error.

Control continues from steps 310 (if false) and step 314 with step 316 and increments the OOC counter. In step 320, control determines whether any of the TPS have an OOR error. If step 320 is false, control determines whether the OOC counter is equal to the first OOC value $TH_1$ in step 324. If step 324 is false, control returns to step 308. If step 328 is true, control sets the OOC fault in step 328, enables the airflow diagnostic system in step 330 and looks up indicated throttle as a function of the OOC and OOR errors and/or faults in step 332. Control continues from step 332 with step 308.

If step 320 is false, control continues with step 336. In step 340, control determines whether the OOR counter for one of the TPS sensors such as TPS1 is equal to zero. If step 340 is false, control determines whether the OOR counter for the TPS1 is not equal to zero. If step 342 is true, control increments the OOR counter in step 344 and continues with step 350. If step 340 is true, control sets the OOR counter equal to the OOC counter in step 346 and continues with step 350.

In step 350, control determines whether the OOR counter is equal to the second OOR value $TH_2$. If step 350 is true, control sets the OOR fault for TPS1 in step 354. In step 356, control enables the airflow diagnostic system. Control continues from step 350 (if false) and step 356 with step 358. In step 358, control determines whether there is another TPS (such as TPS2). If true, control returns to step 340. Otherwise control continues with step 332.

During OOC and OOR errors and not OOC and OOR faults, the airflow diagnostic may be disabled to prevent false diagnosis of airflow errors according to the present disclosure. The airflow errors may occur in conventional systems when the higher one of the TPS sensors is selected during OOC errors. When the higher one of the two TPS sensors is selected in conventional systems, the closed loop system may attempt to close throttle due to differences between indicated throttle and desired throttle. In addition, an airflow error may occur in the conventional system due to differences between predicted and measured airflow.

Since the OOC error typically preceded an OOR error, it was difficult to detect an OOR error. In the present disclosure, the OOR counter is set equal to the OOC counter when the OOR error occurs. In addition, the first OOC value set in the OOC counter is set less than the second OOR value in the OOR counter. Therefore, when an OOR error occurs, the OOR counter will detect the OOR fault before the OOC fault is detected. That way, the OOR faults can be diagnosed independently from the OOC faults.

Table I set forth below shows indicated throttle as a function of OOR and/or OOC errors and/or faults:

TABLE I

| | TPS OOC error False | TPS OOC error True | TPS OOC Fault |
|---|---|---|---|
| OOR_1 error or fault = False; and OOR_2 error or fault = False. | TPS1 | Desired | Default |
| OOR_1 error or fault = False; and OOR_2 error or fault = True. | TPS1 | Desired | Default |
| OOR_1 error or fault = True; and OOR_2 error or fault = False. | TPS2 | Desired | Default |
| OOR_1 fault = True; and OOR_2 fault = True. | Default | Default | Default |
| OOR_1 error or fault = True; and OOR_2 error or fault = True. | Desired | Desired | Default |

The diagnostic system according to the present disclosure avoids unnecessary engine stalling during single sensor OOR failure conditions. The present disclosure also prevents the control module from driving the throttle closed during OOC fault conditions by disabling the airflow diagnostic system under selected conditions. The present disclosure also improves diagnosis by reporting a correct problem code for OOC and OOR faults. This is performed in part by setting the OOR count equal to the OOC count when the OOR error occurs and by using an OOR count value that is less than the OOC count value. Therefore, when the OOC error occurs first as a result of the OOR error, the OOR error will be correctly diagnosed.

What is claimed is:

1. A system comprising:

an out of correlation (OOC) detection module that detects an OOC error between a first throttle position sensor (TPS) and a second TPS;

an out of range (OOR) detection module that detects first and second OOR errors for said first and second TPS, respectively;

an OOC counter that sets an OOC fault when an OOC count is greater than or equal to an OOC value;

an OOR counter that sets first and second OOR faults when first and second OOR counts, respectively, are greater than or equal to an OOR value, which is less than said 000 value; and a control module that increments said OOC count, said first OOR count, and said second OOR count when said OOC error, said first OOR error and said second OOR error, respectively, occur and that sets at least one of said first and second OOR counts equal to said OOC count when said at least one of said first and second OOR errors occur after said OOC error.

2. The system of claim 1 wherein said control module accesses an indicated throttle lookup table (LUT) to set an indicated throttle value to at least one of a first TPS value, a second TPS value, a default throttle position and a desired throttle position.

3. The system of claim 2 wherein said indicated throttle LUT is indexed by at least three of no OOC error/fault, said OOC error, said OOC fault, no first OOR error/fault, said first OOR error, said first OOR fault, no second OOR error/fault, said second OOR error and said second OOR fault.

4. The system of claim 2 wherein said control module and said indicated throttle LUT set said indicated throttle value to a desired throttle value when said OOC error occurs while said first OOR error and fault and said second OOR error and fault are not present.

5. The system of claim 2 wherein said control module and said indicated throttle LUT set said indicated throttle value to a desired throttle value when said OOC error occurs while one of said first and second OOR errors are present.

6. The system of claim 1 further comprising said first and second TPS.

7. The system of claim 1 further comprising:

an airflow prediction module that generates a predicted airflow; and an airflow diagnostic module that diagnoses airflow faults based on measured airflow and said predicted airflow.

8. The system of claim 7 wherein said control module disables said airflow diagnostic module when at least one of said OOC and OOR errors occur while said OOC fault, said first OOR fault and said second OOR fault are not present.

9. A system comprising:

an out of correlation (OOC) detection module that detects an OOC error between a first throttle position sensor (TPS) and a second TPS;

an out of range (OOR) detection module that detects first and second OOR errors for said first and second TPS, respectively;

an OOC counter that sets an OOC fault when an OOC count is greater than or equal to an OOC value;

an OOR counter that sets first and second OOR faults when first and second OOR counts, respectively, are greater than or equal to an OOR value that is less than said OOC value;

a control module that increments said OOC count, said first OOR count, and said second OOR count when said OOC error, said first OOR error and said second OOR error, respectively, occur;

an airflow prediction module that generates a predicted airflow; and an airflow diagnostic module that diagnoses airflow system faults based on measured airflow and said predicted airflow, wherein said control module selectively disables said airflow diagnostic module when at least one of said OOC and OOR errors occur while said first OOR fault and said second OOR fault are not present.

10. The system of claim 9 wherein said control module sets at least one of said first and second OOR counts equal to said OOC count when said at least one of said first and second OOR errors occur after said OOC error.

11. The system of claim 9 wherein said control module accesses an indicated throttle lookup table (LUT) to set an indicated throttle value to at least one of a first TPS value, a second TPS value, a default throttle position and a desired throttle position, wherein said indicated throttle LUT is indexed by at least three of no OCC error/fault, said OOC error, said OOC fault, no first OOR error/fault, said first OOR error, said first OOR fault, no second OOR error/fault, said second OOR error and said second OOR fault.

12. The system of claim 11 wherein said control module and said indicated throttle LUT set said indicated throttle value to a desired throttle value when said OOC error occurs while said first OOR error and fault and said second OOR error and fault are not present.

13. The system of claim 11 wherein said control module and said indicated throttle LUT set said indicated throttle value to a desired throttle value when said OOC error occurs while one of said first and second OOR errors are present.

14. A method comprising:

detecting an OOC error between a first throttle position sensor (TPS) and a second TPS;

detecting first and second OOR errors for said first and second TPS, respectively;

setting an OOC fault when an OOC count is greater than or equal to an OOC value;

setting first and second OOR faults when first and second OOR counts, respectively, are greater than or equal to an OOR value that is less than said OOC value;

incrementing said OOC count, said first OOR count, and said second OOR count when said OOC error, said first OOR error and said second OOR error, respectively, occur; and setting at least one of said first and second OOR counts equal to said OOC count when said at least one of said first and second OOR errors occur after said OOC error.

15. The method of claim 14 further comprising setting an indicated throttle value to at least one of a first TPS value, a second TPS value, a default throttle position and a desired throttle position.

16. The method of claim 15 further comprising indexing a lookup table storing said indicated throttle value by at least three of no OCC error/fault, said OOC error, said OOC fault, no first OOR error/fault, said first OOR error, said first OOR fault, no second OOR error/fault, said second OOR error and said second OOR fault.

17. The method of claim 15 further comprising setting said indicated throttle value to a desired throttle value when said OOC error occurs while said first OOR error and fault and said second OOR error and fault are not present.

18. The method of claim 14 further comprising:

generating a predicted airflow; and diagnosing airflow faults based on measured airflow and said predicted airflow.

19. The method of claim 18 further comprising disabling diagnosing airflow faults when at least one of said OOC and OOR errors occur while said OOC fault, said first OOR fault and said second OOR fault are not present.

20. The method of claim 18 further comprising setting said indicated throttle value to a desired throttle value when said OOC error occurs while one of said first and second OOR errors are present.

* * * * *